US011090631B2

(12) United States Patent
Oikawa et al.

(10) Patent No.: US 11,090,631 B2
(45) Date of Patent: Aug. 17, 2021

(54) METHOD FOR HYDROPHOBIZATION OF HYDROPHILIC MATERIAL

(71) Applicant: SHIMADZU CORPORATION, Kyoto (JP)

(72) Inventors: Yukio Oikawa, Kyoto (JP); Shigeyoshi Horiike, Kyoto (JP); Hirotaka Koyama, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 0 days.

(21) Appl. No.: 16/811,329

(22) Filed: Mar. 6, 2020

(65) Prior Publication Data
US 2020/0324272 A1 Oct. 15, 2020

(30) Foreign Application Priority Data
Apr. 10, 2019 (JP) .............................. JP2019-074772

(51) Int. Cl.
| B01J 20/287 | (2006.01) |
| C07F 7/08 | (2006.01) |
| B01J 20/22 | (2006.01) |
| B01J 20/28 | (2006.01) |
| B01J 20/291 | (2006.01) |
| B01J 20/30 | (2006.01) |
| B01J 20/32 | (2006.01) |
| B01D 15/20 | (2006.01) |
| B01D 15/32 | (2006.01) |

(52) U.S. Cl.
CPC .......... *B01J 20/287* (2013.01); *B01D 15/206* (2013.01); *B01D 15/327* (2013.01); *B01J 20/22* (2013.01); *B01J 20/28028* (2013.01); *B01J 20/28047* (2013.01); *B01J 20/291* (2013.01); *B01J 20/3092* (2013.01); *B01J 20/3204* (2013.01); *B01J 20/3217* (2013.01); *B01J 20/3259* (2013.01); *B01J 20/3293* (2013.01); *C07F 7/0805* (2013.01); *B01J 2220/52* (2013.01)

(58) Field of Classification Search
CPC .... B01J 20/287; B01J 20/22; B01J 20/28028; B01J 20/28047; B01J 20/291; B01J 20/3092; B01J 20/3204; B01J 20/3217; B01J 20/3259; B01J 20/3293; B01D 15/206; B01D 15/327
See application file for complete search history.

(56) References Cited

U.S. PATENT DOCUMENTS

| 5,160,625 A * | 11/1992 | Jonsson | B01D 43/00 210/198.2 |
| 9,897,577 B2 * | 2/2018 | Klein | G01N 30/38 |
| 2004/0118762 A1 * | 6/2004 | Xu | B01J 39/26 210/198.2 |
| 2005/0178730 A1 * | 8/2005 | Li | B01J 20/288 210/656 |
| 2011/0100915 A1 * | 5/2011 | Kanda | B01D 15/322 210/656 |
| 2014/0319057 A1 * | 10/2014 | Brousmiche | B01D 15/305 210/656 |
| 2015/0177263 A1 * | 6/2015 | Kaneko | B01D 15/3804 435/7.94 |
| 2015/0298097 A1 * | 10/2015 | Rahane | B01J 20/3227 210/656 |
| 2017/0349612 A1 * | 12/2017 | Chen | C01B 33/12 |

FOREIGN PATENT DOCUMENTS

JP 2003-172733 6/2003

OTHER PUBLICATIONS

C. Johann et al., 1218 Journal of Chromatography A, 4126-41431 (2011) (Year: 2011).*
J. Giddings et al., 260 Science, 1456-1465 (1993) (Year: 1993).*
J. Jönsson et al., 61 Analytical Chemistry, 11-18 (1989) (Year: 1989).*
A. Zattoni et al., 3 Current Analytical Chemistry, 310-323 (2007) (Year: 2007).*
A. Carlshaf et al., 461 Journal of Chromatography A, 89-93 (1989) (Year: 1989).*
Amino Acid—Britannica Online Encyclopedia (Jul. 17, 2009) (Year: 2009).*
K. Dill et al., Science : Technical Comments, 297 (1990) (Year: 1990).*
J. Hildebrand, 76 Proc. Natl. Acad. Sci. USA, 194 (1979) (Year: 1979).*
Q. Lin et al., 21 Langmuir, 251-255 (2005) (Year: 2005).*
N. Giovambattista et al., Journal of Physical Chemistry B, 13723-13724 (2009) (Year: 2009).*
S. Shimizu et al., 113 Journal of Chemical Physics, 4683-4700 (2000) (Year: 2000).*
Y Tsao et al., 7 Langmuir, 3154-3159 (1991) (Year: 1991).*
C. Jan van Oss, 16 Journal of Molecular Recognition, 177-190 (2003) (Year: 2003).*
Donaldson et al., 31 Langmuir, 2051-2064 (2014) (Year: 2014).*
E. Meyer et al., 103 PNAS, 15739-15746 (2006) (Year: 2006).*
A. Lyire et al., Scientific Reports, 1-15 (2016) (Year: 2016).*

(Continued)

Primary Examiner — Alexander R Pagano
(74) Attorney, Agent, or Firm — Wenderoth, Lind & Ponack, L.L.P.

(57) ABSTRACT

The present invention provides a method for hydrophobization of a hydrophilic material, the method including introducing a hydrophobic group into a hydroxyl group (—OH group) on a surface of the hydrophilic material. A method for hydrophobization of a hydrophilic material, the method comprising reacting a hydrophilic material to be hydrophobized with a hydrophobic group-containing silylating agent in presence of an amino acid as a reaction accelerator, to introduce a hydrophobic group-containing silyl group to a surface of the hydrophilic material. A hydrophobized silica gel column filler is produced by using the method. Further, a hydrophobized silica gel column is produced by filling a column with the hydrophobized silica gel column filler.

11 Claims, 2 Drawing Sheets

(56) References Cited

OTHER PUBLICATIONS

R. Weast, CRC Handbood of Chemistry and Physics (66th ed., 1985) (Year: 1985).*
C. Schmidt et al., 88 J. Biol. Chem. (1930) (Year: 1930).*
T. Chen et al., 134 Food Chemistry, 9-14 (2012) (Year: 2012).*
Q. Yang et al., ACS Sustainable Chemistry & Engineering, 3526-3534 (2016) (Year: 2016).*
A. Medici et al., 25 Macromolecules, 2569-2574 (1992) (Year: 1992).*
J. Ge et al., 535 Chemical Physics Letters, 100-105 (2012) (Year: 2012).*
C. Insomphun et al., AMB Express (2016) (Year: 2016).*
S. Pal et al., 16 Crystal Growth & Design, 5852-5858 (2016) (Year: 2016).*
A. Zattoni et al., 1218 Journal of Chromatography A, 4132-4137 (2011) (Year: 2011).*
H. Zhang et al., 14 Nature Protocols, 1027-1053 (2019) (Year: 2019).*
Sudo et al., "Silica-Based Column for Reversed Phase Chromatography", Chromatography, 2011, vol. 32, No. 2, pp. 73-79, with English Translation.

* cited by examiner

With octadecylsilylation

With octadecylsilylation

With octadecylsilylation
after TFA solution treatment

Without octadecylsilylation

Without octadecylsilylation

Without octadecylsilylation
after TFA solution treatment

METHOD FOR HYDROPHOBIZATION OF HYDROPHILIC MATERIAL

BACKGROUND OF THE INVENTION

Technical Field of the Invention

The present invention relates to a method for hydrophobization of a hydrophilic material.

Background Art

As for various hydrophilic materials, for example, inorganic hydrophilic materials, a hydroxyl group (—OH group) exists on a surface of a metal oxide material such as silica or titanium oxide, and this causes to exhibit the hydrophilicity. By hydrophobizing the surface of such hydrophilic materials, hydrophilicity/hydrophobicity of the surface is adjusted, and thus the hydrophilic materials are used as separating materials for various substances, semiconductor materials, or antifouling materials.

As for organic hydrophilic materials, a hydroxyl group (—OH group) exists on a surface of fibers such as regenerated cellulose, and this causes to exhibit the hydrophilicity. By hydrophobizing the surface of such hydrophilic materials, hydrophilicity/hydrophobicity of the surface is adjusted, and thus the hydrophilic materials are used as separating materials for various substances.

For example, as a filler used in a column of high performance liquid chromatography (HPLC), those having improved separation selectivity by introduction of, for example, an octadecylsilyl group into a silanol group (Si—OH group) on the hydrophilic silica gel surface are the mainstream.

For introducing an octadecylsilyl group into a silanol group on the silica gel surface, a silylating agent such as octadecyltrichlorosilane or dimethyloctadecylchlorosilane is reacted with silica gel with use of an organic reaction solvent such as toluene, N,N-dimethylformamide (DMF), or 1,1,2-trichloroethane. At this time, an aromatic amine such as pyridine, morpholine, or imidazole is used as a catalyst (Non-Patent Document 1), In the aromatic amine, the electron donating property is impaired by delocalization of the unshared electron pair of the amine N atom, so that the catalytic activity is weak.

Also, a two-step reaction is known that includes adding trimethylchlorosilane (TMCS) and hexamethyldisilazane (HMDS) one by one or in a mixture thereof to an octadecylsilylated silica gel filler having finished a primary end-capping, under a reflux temperature of a non-aqueous organic reaction solvent such as toluene (to which a molecular sieve 4A/3A is injected) so as to inactivate (end-cap) the octadecylsilylated silica gel filler, and conducting end-capping at higher temperatures (230° C. to 250° C.). However, this method requires a long-time treatment at high temperature. While pyridine, diethylamine or the like is used as a catalyst for accelerating the reaction, there is a problem that the catalytic activity is weak, and perfect end-capping is difficult to be achieved (for example, description is found in Japanese Unexamined Patent Publication No. 2003-172733).

Japanese Unexamined Patent Publication No. 2003-172733 discloses a method for producing an octadecylsilylated silica gel filler, the method including end-capping with use of a combination of a secondary amine (diethylamine) and a tertiary amine (triethylamine) as a reaction accelerator for perfect end-capping (claims 1, 2, 3). In the secondary amine and the tertiary amine, however, there is steric hindrance in the vicinity of the amine N atom, and the electron donating property of the amine N atom is impaired, so that the catalytic activity is weak.

CITATION LIST

Patent Document

Patent Document 1: Japanese Unexamined Patent Publication No, 2003-172733

Non-Patent Document

Non-Patent Document 1: "Silica-Based Column for Reversed Phase Chromatography", Yoshihisa Sudo, CHROMATOGRAPHY, Vol. 32 No. 2 (2011) 73-79

SUMMARY OF THE INVENTION

Problems to be Solved by the Invention

As described above, an aromatic amine, or a combination of a secondary amine and a tertiary amine has been used as a catalyst in the reaction of introducing a hydrophobic group into a hydroxyl group (—OH group) on a surface of a hydrophilic material. However, in the aromatic amine, the electron donating property is impaired by delocalization of the unshared electron pair of the amine N atom, so that the catalytic activity is weak, and in the secondary amine and the tertiary amine, there is steric hindrance in the vicinity of the amine N atom, and the electron donating property of the amine N atom is impaired, so that the catalytic activity is weak, and a long-time treatment at high temperature is required. Further, pyridine is highly flammable (flash point: 21° C.), and has its peculiar odor, and is harmful to a human body if a large amount of pyridine is sucked.

In light of the above, an object of the present invention is to provide a method for hydrophobization of a hydrophilic material, the method comprising introducing a hydrophobic group into a hydroxyl group (—OH group) on a surface of the hydrophilic material.

Means for Solving the Problems

The present inventors have made diligent efforts, and found that a method for hydrophobization of a hydrophilic material is provided by using an amino acid as a reaction accelerator/catalyst in a reaction of introducing a hydrophobic group into a hydroxyl group (—OH group) on a surface of the hydrophilic material.

A first aspect of the present invention is a method for hydrophobization of a hydrophilic material, the method comprising reacting a hydrophilic material to be hydrophobized with a hydrophobic group-containing silylating agent in presence of an amino acid as a reaction accelerator, to introduce a hydrophobic group-containing silyl group to a surface of the hydrophilic material.

A second aspect of the present invention is a method for producing a hydrophobized silica gel column filler, the method comprising reacting a silica gel material to be hydrophobized with a hydrophobic group-containing silylating agent in presence of an amino acid as a reaction accelerator, to introduce a hydrophobic group-containing silyl group to a surface of the silica gel material.

Also, provided is a method for producing a hydrophobized silica gel column, the method comprising filling a column with the hydrophobized silica gel column filler.

A third aspect of the present invention is a method for producing a hydrophobized Si substrate, the method comprising reacting a Si substrate material to be hydrophobized with a hydrophobic group-containing silylating agent in presence of an amino acid as a reaction accelerator, to introduce a hydrophobic group-containing silyl group to a surface of the Si substrate material.

A fourth aspect of the present invention is a method for producing a hydrophobized hollow fiber material, the method comprising reacting a hollow fiber material to be hydrophobized with a hydrophobic group-containing silylating agent in presence of an amino acid as a reaction accelerator, to introduce a hydrophobic group-containing silyl group to a surface of the hollow fiber material.

Also provided is a method for producing an AF4/HF5 separation module by using the hydrophobized hollow fiber material.

Advantageous Effect of the Invention

According to the present invention, provided is a method for hydrophobization of a hydrophilic material by using an amino acid as a reaction accelerator/catalyst in a reaction of introducing a hydrophobic group into a hydroxyl group (—OH group) on a surface of the hydrophilic material.

In the present invention, the amino acid used as a reaction accelerator/catalyst is harmless and safe. The material into which the hydrophobic group is introduced is also excellent in hydrolysis resistance by acid.

According to the present invention, it is possible to produce a hydrophobized silica gel column, a hydrophobized Si substrate used for a channel substrate of a semiconductor or a micro reactor, and an AF4/HF5 separation module including a hydrophobized hollow fiber material.

MODES FOR CARRYING OUT OF THE INVENTION

Figure 1:
FIG. 1 is an oblique photograph of a waterdrop dropped on a Si substrate surface in Example 1-1.

A first embodiment of the present invention is a method for hydrophobization of a hydrophilic material, the method comprising reacting a hydrophilic material to be hydrophobized with a hydrophobic group-containing silylating agent in the presence of an amino acid as a reaction accelerator, to introduce a hydrophobic group-containing silyl group to a surface of the hydrophilic material.

As the hydrophilic material to be hydrophobized, various materials can be recited. For example, as for inorganic hydrophilic materials, a hydroxyl group (—OH group) exists on a surface of a metal oxide material such as silica or titanium oxide, and this causes to exhibit the hydrophilicity, By hydrophobizing the surface of such hydrophilic materials, hydrophilicity/hydrophobicity of the surface is adjusted, and thus the hydrophilic materials are used as separating materials for various substances, semiconductor materials, or antifouling materials.

As for such separating materials for various substance, for example, as a filler used in a column of high performance liquid chromatography (HPLC), those having improved separation selectivity by introduction of, for example, an octadecylsilyl group (ODS) of C18 into a silanol group (Si—OH group) on the hydrophilic silica gel surface are the mainstream. By introducing a hydrocarbon group having carbons C1 to C18, or an aromatic-containing group depending on the substance intended to be separated, the separation selectivity can be adjusted.

Also, a hydrophobic group-containing silyl group can be introduced to a surface of a Si substrate as a semiconductor material to make the surface of the Si substrate hydrophobized, and thus hydrophilicity/hydrophobicity of the Si substrate can be adjusted.

Also, a hydrophobic group-containing silyl group can be introduced to a surface of a hydrophilic material substrate, to form an antifouling surface layer by the hydrophobic group-containing silyl group layer, and the substrate on which the antifouling surface layer is formed can be used as an antifouling material.

As for organic hydrophilic materials, a hydroxyl group (—OH group) exists on a surface of fibers such as regenerated cellulose, and this causes to exhibit the hydrophilicity. By hydrophobizing the surface of such hydrophilic materials, hydrophilicity/hydrophobicity of the surface is adjusted, and thus the hydrophilic materials are used as separating materials for various substances.

Examples of such separating materials for various substances include hollow fibers used in an asymmetric flow field flow fractionation AF4 method separation module, and a hollow fiber flow (FFF) HF5 method separation module.

The hydrophobic group-containing silylating agent as a reaction agent can be selected from those known in the art, and for example, an organosilicon compound represented by the formula (I) can be used.

$$(X)_n Si(R)_{4-n} \quad (I)$$

Here, X represents a halogen atom or an alkoxy group, R may be the same or different from each other depending on 4-n, and each is a hydrocarbon group that may have a substituent. n represents 1, 2 or 3.

In the formula (I), the hydrocarbon group represented by R can be a saturated or unsaturated aliphatic group having 1 to 20 carbon atoms, or an aromatic group.

Examples of the saturated or unsaturated aliphatic group having 1 to 20 carbon atoms include a methyl group, an ethyl group, a propyl group, a butyl group, a pentyl group, a hexyl group, a pentyl group, an octyl group, a nonyl group, a decyl group, an endecyl group, a dodecyl group, a tridecyl group, a tetradecyl group, a pentadecyl group, a hexadecyl group, a heptadecyl group, an octadecyl group, a nonadecyl group, an oleyl group, and a 2-ethylhexyl group.

Examples of the aromatic group include those having 6 or more carbon atoms, such as a phenyl group. Examples of the aromatic-containing group include a benzyl group.

The hydrocarbon group represented by R may have a substituent. Examples of the substituent include alkoxy groups such as a methoxy group and an ethoxy group.

In the general formula (I), the halogen atom represented by X is a chlorine atom, a bromine atom or an iodine atom.

In the general formula (I), examples of the alkoxy group represented by X include lower alkoxy groups having about 1 to 4 carbon atoms, such as a methoxy group, an ethoxy group and a propyl group.

More specific examples of the hydrophobic group-containing silylating agent may include, but are not limited to, trimethylchlorosilane, dimethylpropylchlorosilane, propyltrichlorosilane, dimethylbutylchlorosilane, butyltrichlorosilane, dimethylhexylchlorosilane, hexyltrichlorosilane, dimethyloctylchlorosilane, octyltrichlorosilane, dimethyldecylchlorosilane, decyltrichlorosilane, dimethyldodecylchlorosilane, dodecyltrichlorosilane, dimethylhexadecylchlorosilane, hexadecyltrichlorosilane, dimethyloctadecylchlorosilane, octadecyltrichlorosilane, dimethylphenylchlorosilane, and phenyltrichlorosilane.

In the above formula (I), when n=1, namely when there is one X (halogen atom or alkoxy group), the compound is monofunctional, and a monomeric phase is formed. On the other hand, when n=3, namely, when there are three Xs (halogen atom or alkoxy group), the compound is trifunctional, a monomeric phase tends to be formed in an anhydrous reaction system, and a polymeric phase tends to be formed when water exists in the reaction system. It is better to select the hydrophobic group-containing silylating agent in consideration of these facts.

An amino acid is used as a reaction accelerator or a catalyst. The amino acid is not particularly limited, but a basic amino acid is used in consideration of the electron donating property.

The amino acid may be a natural amino acid, or a non-natural amino acid, and may be a D isomer or an L isomer. For example, the amino acid may be selected from arginine, lysine, histidine, tryptophan, ornithine, and modified compounds of these amino acids.

In consideration of the electron donating property, it would be desired that protonation does not occur in the amino group of the amino acid in the silylation reaction system. From that point of view, an amino acid having a pKb of, for example, about 4.5 to 8.5 can be used, More specifically, an amino acid having a pKb of, for example, about 4.96 to 8.03 can be used. For example, arginine having a pKb of 4.96 is preferably used.

An adding amount of the amino acid as a reaction accelerator or a catalyst in the reaction system can be, for example, 1.3 to 2.6 mg/mL (about 7.4 to 15 mM).

An amount relative to the hydrophobic group-containing silylating agent as a reaction agent may be about 10 folds (2 nM) the amount of 0.2 nM silanol group.

Examples of the reaction solvent that can be used include, but are not limited to, organic reaction solvents such as toluene, N,N-dimethylformamide (DMF), or 1,1,2-trichloroethane.

The reaction conditions can be appropriately determined by a person skilled in the art, and the reaction can be conducted, for example, at a temperature of about 60° C. to 70° C. for a time of about 0.5 to 1 hour.

By using an amino acid that is harmless and safe as a reaction accelerator/catalyst, it is possible to efficiently introduce a hydrophobic group-containing silyl group to a surface of the hydrophilic material. In general, it is known that the reactivity of a geminal silanol group is higher than that of a vicinal silanol group, and a hydrophobized material shows strong adsorption to a basic compound.

EXAMPLES

Hereinafter, the present invention will be described specifically with reference to examples; however, it is to be noted that, the present invention is not limited to these examples. In the following, the amount of a matter indicated in % is on a weight basis for a solid matter, and is on a volume basis for a liquid matter unless otherwise indicated.

Example 1

As reagents, special grade reagents available from Wako Pure Chemical Corporation or TOKYO CHEMICAL INDUSTRY CO, LTD, were used.

Example 1-1

Octadecylsilylation of Si Substrate

In advance, as an octadecylsilylating (ODS) agent, dimethyloctadecylchlorosilane (MW: 347.09, mp 28-31° C., TOKYO CHEMICAL INDUSTRY CO., LTD., special grade reagent) was partly dissolved by heating in a dryer oven at 60° C. for 30 minutes.

First, a Si substrate piece (0.5 cm×0.5 cm, 1.0 mm thick, with natural oxide film, available from ELECTRONICS AND MATERIALS CORPORATION LIMITED) was put into a 1.5-mL Eppendorf tube, and dried on a heat block at 80° C. for 10 minutes. Then, 15.3 mM (2.67 mg) of L(+)-arginine (MW: 174.2, available from Wako Pure Chemical) was weighed, and added to the Eppendorf tube containing the Si substrate piece, and the Eppendorf tube was kept at 80° C. for 5 minutes. Then 1 mL of toluene was added to the Eppendorf tube, and the Eppendorf tube was kept at 80° C. for 5 minutes. To this Eppendorf tube, 0.2 mL (0.49 mM) of dimethyloctadecylchlorosilane that had been partly dissolved in advance by incubation was added, and reacted at 80° C. for 1 minute, Thereafter, the reaction was further advanced by allowing the Eppendorf tube to stand still at room temperature (25° C.) for 16 hours. At the time of ending of the reaction, formation of a thin film on the surface of the Si substrate could be observed by visual observation.

After end of the reaction, 1 mL of ethanol was added to the Eppendorf tube and the Si substrate was washed, and then the ethanol was discarded. This ethanol washing operation was conducted twice. After washing with ethanol, the Si substrate having subjected to the octadecylsilylation surface treatment was taken out, and the taken out octadecylsilylated Si substrate was washed twice with water, and dried at 60° C. for 5 minutes. In this manner, the octadecylsilylated Si substrate was prepared.

(Measurement of Contact Angle)

Using a contact angle meter (DMo-601, available from Kyowa Interface Science Co, Ltd.), a contact angle of pure water of the obtained octadecylsilylated Si substrate surface was measured in an atmosphere at a temperature of 25° C. and a relative humidity of 50%. The contact angle was 98.7°. This is the mean value of n=5. The photographs at this time are shown in FIG. 1 and FIG. 2.

Figure 2:
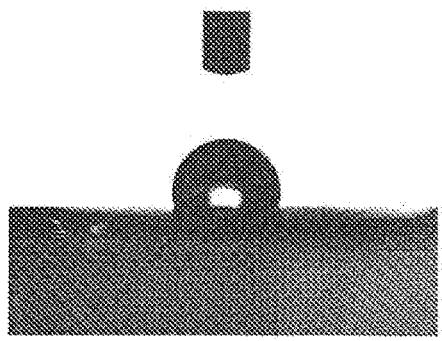
FIG. 2 is a side photograph of the waterdrop dropped on the Si substrate surface in Example 1-1.

FIG. 1 is an oblique photograph of a waterdrop dropped on the Si substrate surface, and FIG. 2 is a side photograph of the waterdrop dropped on the Si substrate surface.

Example 1-2

Hydrolysis Resistance of Octadecylsilylated Si Substrate Surface

Resistance of the octadecylsilylated Si substrate surface obtained in Example 1-1 to hydrolysis by 0.02 (v/v) % trifluoro acetic acid (TFA) was examined.

To a mixed solution of 10 mL of acetonitrile and 90 mL of water, 20 µL of TFA (Wako Pure Chemical special grade reagent) was added to prepare a 0.02 (v/v) % TFA solution.

The octadecylsilylated Si substrate obtained in Example 1-1 was put into a 1.5-mL Eppendorf tube, and 1.0 mL of the prepared TFA solution was added to this, and then the Eppendorf tube was allowed to stand still at room temperature (25° C.) for 16 hours. To the Eppendorf tube, 1 mL of ethanol was added and the Si substrate was washed, and then the ethanol was discarded. This ethanol washing operation was conducted twice. After washing with ethanol, the Si substrate was taken out, and the taken out Si substrate was washed twice with water, and dried at 60° C. for 5 minutes.

After drying, a contact angle was measured in the same manner as in Example 1-1. The contact angle was 1047°. This is the mean value of n=5. A decrease in contact angle was not observed, and hydrolysis of the octadecylsilyl group did not occur. The photograph at this time is shown in FIG. 3.

Figure 3:
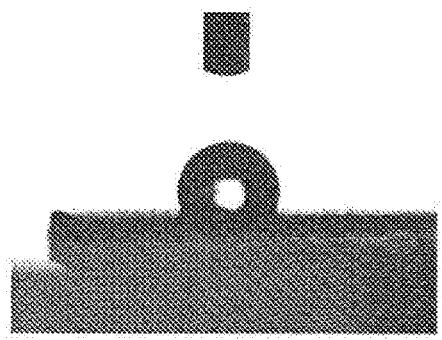
FIG. 3 is a side photograph of a waterdrop dropped on a Si substrate surface after a TFA treatment in Example 1-2.

FIG. 3 is a side photograph of a waterdrop dropped on the Si substrate surface after the TFA treatment.

Comparative Example 1

Comparative Example 1-1

A treatment for a Si substrate surface was conducted in the same manner as in Example 1-1 except that octadecylchlorosilane was not added. A contact angle was measured in the same manner as in Example 1-1. The contact angle was 59.5°. This is the mean value of n=5. The photographs at this time are shown in FIG. 4 and FIG. 5.

Figure 4:
FIG. 4 is an oblique photograph of a waterdrop dropped on a Si substrate surface in Comparative Example 1-1.
Figure 5:
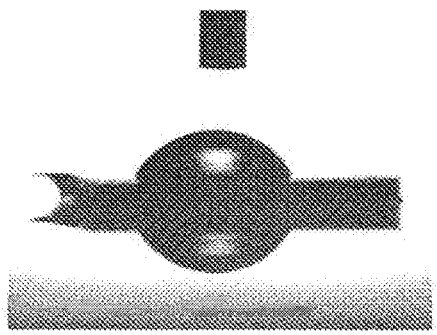
FIG. 5 is a side photograph of the waterdrop dropped on the Si substrate surface in Comparative Example 1-1.

FIG. 4 is an oblique photograph of a waterdrop dropped on the Si substrate surface, and FIG. 5 is a side photograph of the waterdrop dropped on the Si substrate surface.

Comparative Example 1-2

Next, resistance of the Si substrate obtained in Comparative Example 1-1 to hydrolysis by 0.02 (v/v) % trifluoro acetic acid (TFA) was examined in the same manner as in Example 1-2. A contact angle was measured in the same manner as in Example 1-2. The contact angle was 55.7°. This is the mean value of n=5. An octadecylsilyl group was not introduced, and the contact angle was on the same level as before the TFA treatment. The photograph at this time is shown in FIG. 6.

Figure 6:
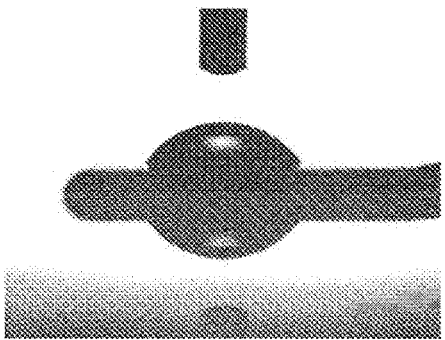
FIG. 6 is a side photograph of a waterdrop dropped on a Si substrate surface after a TFA treatment in Comparative Example 1-2.

FIG. 6 is a side photograph of a waterdrop dropped on the Si substrate surface after the TFA treatment.

These results are shown in Table 1.

TABLE 1

| Si substrate | Comparative Example 1 Without octadecylsilylation Contact angle | Example 1 With octadecylsilylation Contact angle |
|---|---|---|
| After Si substrate surface treatment | 59.5° | 98.7° |
| After 0.02 (v/v) % TFA treatment | 55.7° | 104.7° |

(1)
A method for hydrophobization of a hydrophilic material, the method comprising reacting a hydrophilic material to be hydrophobized with a hydrophobic group-containing silylating agent in presence of an amino acid as a reaction accelerator, to introduce a hydrophobic group-containing silyl group to a surface of the hydrophilic material.

(2)
The method according to the above (1), wherein the hydrophobic group-containing silylating agent is an organosilicon compound represented by formula (I):

$$(X)_n Si(R)_{4-n} \qquad (I)$$

wherein X represents a halogen atom or an alkoxy group, R may be the same or different from each other and each is a hydrocarbon group that may have a substituent, and n represents 1, 2, or 3.

(3)
The method according to the above (2), wherein in the formula (I), the hydrocarbon group represented by R is a saturated or unsaturated aliphatic group having 1 to 20 carbon atoms, or an aromatic group.

(4)
The method according to the above (2) or (3), wherein in the formula (I), the halogen atom represented by X is a chlorine atom.

(5)
The method according to any one of the above (1) to (4), wherein the hydrophobic group-containing silylating agent is selected from the group consisting of trimethylchlorosilane, dimethylpropylchlorosilane, propyltrichlorosilane, dimethylbutylchlorosilane, butyltrichlorosilane, dimethylhexylchlorosilane, hexyltrichlorosilane, dimethyloctylchlorosilane, octyltrichlorosilane, dimethyldecylchlorosilane, decyltrichlorosilane, dimethyldodecylchlorosilane, dodecyltrichlorosilane, dimethylhexadecylchlorosilane, hexadecyltrichlorosilane, dimethyloctadecylchlorosilane, octadecyltrichlorosilane, dimethylphenylchlorosilane, and phenyltrichlorpsilane.

(6)
The method according to any one of the above (1) to (5), wherein the amino acid is a basic amino acid.

(7)
The method according to any one of the above (1) to (6), wherein the amino acid is selected from the group consisting of arginine, lysine, histidine, tryptophan, ornithine, and modified compounds of these amino acids.

(8)
A method for producing a hydrophobized silica gel column filler, the method comprising reacting a silica gel material to be hydrophobized with a hydrophobic group-containing silylating agent in presence of an amino acid as a reaction accelerator, to introduce a hydrophobic group-containing silyl group to a surface of the silica gel material.

(9)
A method for producing a hydrophobized silica gel column, the method comprising:
reacting a silica gel material to be hydrophobized with a hydrophobic group-containing silylating agent in presence of an amino acid as a reaction accelerator, to introduce a hydrophobic group-containing silyl group to a surface of the silica gel, thereby obtaining a hydrophobized silica gel column filler; and
filling a column with the hydrophobized silica gel column filler.

(10)
A method for producing a hydrophobized Si substrate, the method comprising reacting a Si substrate material to be hydrophobized with a hydrophobic group-containing silylating agent in presence of an amino acid as a reaction accelerator, to introduce a hydrophobic group-containing silyl group to a surface of the Si substrate material.

(11)
A method for producing a hydrophobized hollow fiber material, the method comprising reacting a hollow fiber material to be hydrophobized with a hydrophobic group-containing silylating agent in presence of an amino acid as a reaction accelerator, to introduce a hydrophobic group-containing silyl group to a surface of the hollow fiber material.

(12)
A method for producing an AF4/HF5 separation module, the method comprising:
reacting a hollow fiber material to be hydrophobized with a hydrophobic group-containing silylating agent in presence of an amino acid as a reaction accelerator, to introduce a hydrophobic group-containing silyl group to a surface of the hollow fiber material, thereby obtaining a hydrophobized hollow fiber material; and
forming an AF4/HF5 separation module by using the hydrophobized hollow fiber material.

What is claimed is:

1. A method comprising reacting a material to be hydrophobized with a hydrocarbon group-containing silylating agent in presence of an amino acid as a reaction accelerator, to introduce a hydrocarbon group-containing silyl group to a surface of the material,
wherein the material has a hydroxyl group on a surface thereof and is selected from a silica substrate, a silica gel or a hollow fiber,
the amino acid is a basic amino acid, and
the hydrocarbon group-containing silylating agent is an organosilicon compound represented by formula (I):

  (I)

wherein X represents a halogen atom or an alkoxy group, R may be the same or different from each other and each is a hydrocarbon group that may have a substituent, and n represents 1, 2, or 3.

2. The method according to claim 1, wherein in the formula (I), the hydrocarbon group represented by R is a saturated or unsaturated aliphatic group having 1 to 20 carbon atoms, or an aromatic group.

3. The method according to claim 1, wherein in the formula (I), the halogen atom represented by X is a chlorine atom.

4. The method according to claim 1, wherein the hydrocarbon group-containing silylating agent is selected from the group consisting of trimethylchlorosilane, dimethylpropylchlorosilane, propyltrichlorosilane, dimethylbutylchlorosilane, butyltrichlorosilane, dimethylhexylchlorosilane, hexyltrichlorosilane, dimethyloctylchlorosilane, octyltrichlorosilane, dimethyldecylchlorosilane, decyltrichlorosilane, dimethyldodecylehlorosilane, dodecyltrichlorosilane, dimethylhexadecylchlorosilane, hexadecyltrichlorosilane, dimethyloctadecylchlorosilane, octadecyltrichlorosilane, dimethylphenylchlorosilane, and phenyltrichlorosilane.

5. The method according to claim 1, wherein the amino acid is selected from the group consisting of arginine, lysine, histidine, ornithine, and modified compounds of these amino acids.

6. A method for producing a hydrophobized silica gel column filler, the method comprising:
reacting a silica gel material to be hydrophobized with a hydrocarbon group-containing silylating agent in presence of an amino acid as a reaction accelerator, to introduce a hydrocarbon group-containing silyl group to a surface of the silica gel material,
wherein the amino acid is a basic amino acid, and
the hydrocarbon group-containing silylating agent is an organosilicon compound represented by formula (I):

  (I)

wherein X represents a halogen atom or an alkoxy group, R may be the same or different from each other and each is a hydrocarbon group that may have a substituent, and n represents 1, 2, or 3.

7. A method for producing a hydrophobized silica gel column, the method comprising:
reacting a silica gel material to be hydrophobized with a hydrocarbon group-containing silylating agent in presence of an amino acid as a reaction accelerator, to introduce a hydrocarbon group-containing silyl group to a surface of the silica gel material, thereby obtaining a hydrophobized silica gel column filler; and
filling a column with the hydrophobized silica gel column filler,
wherein the amino acid is a basic amino acid, and
the hydrocarbon group-containing silylating agent is an organosilicon compound represented by formula (I):

  (I)

wherein X represents a halogen atom or an alkoxy group, R may be the same or different from each other and each is a hydrocarbon group that may have a substituent, and n represents 1, 2, or 3.

8. A method for producing a hydrophobized Si substrate, the method comprising:
reacting a Si substrate material to be hydrophobized with a hydrocarbon group-containing silylating agent in presence of an amino acid as a reaction accelerator, to introduce a hydrocarbon group-containing silyl group to a surface of the Si substrate material,
wherein the amino acid is a basic amino acid, and
the hydrocarbon group-containing silylating agent is an organosilicon compound represented by formula (I):

  (I)

wherein X represents a halogen atom or an alkoxy group, R may be the same or different from each other and each is a hydrocarbon group that may have a substituent, and n represents 1, 2, or 3.

9. A method for producing a hydrophobized hollow fiber material, the method comprising:
reacting a hollow fiber material to be hydrophobized with a hydrocarbon group-containing silylating agent in presence of an amino acid as a reaction accelerator, to introduce a hydrocarbon group-containing silyl group to a surface of the fiber material,
wherein the amino acid is a basic amino acid, and
the hydrocarbon group-containing silylating agent is an organosilicon compound represented by formula (I):

  (I)

wherein X represents a halogen atom or an alkoxy group, R may be the same or different from each other and each is a hydrocarbon group that may have a substituent, and n represents 1, 2, or 3.

10. A method for producing an AF4/HF5 separation module, the method comprising:
reacting a hollow fiber material to be hydrophobized with a hydrocarbon group-containing silylating agent in presence of an amino acid as a reaction accelerator, to introduce a hydrocarbon group-containing silyl group to a surface of the fiber material, thereby obtaining a hydrophobized hollow fiber material; and forming an AF4/HF5 separation module by using the hydrophobized hollow fiber material, wherein the amino acid is a basic amino acid, and the hydrocarbon group-containing silylating agent is an organosilicon compound represented by formula (I):

wherein X represents a halogen atom or an alkoxy group, R may be the same or different from each other and each is a hydrocarbon group that may have a substituent, and n represents 1, 2, or 3.

11. The method according to claim 1, wherein the amino acid has a pKb of 4.5 to 8.5.

* * * * *